United States Patent
Gomez et al.

(10) Patent No.: US 9,453,423 B2
(45) Date of Patent: Sep. 27, 2016

(54) TURBOMACHINE

(71) Applicant: MTU Aero Engines GmbH, Munich (DE)

(72) Inventors: Sergio Elorza Gomez, Munich (DE); Tim Schneider, Dachau (DE)

(73) Assignee: MTU Aero Engines GmbH, Munich (DE)

( * ) Notice: Subject to any disclaimer, the term of this patent is extended or adjusted under 35 U.S.C. 154(b) by 643 days.

(21) Appl. No.: 13/760,598

(22) Filed: Feb. 6, 2013

(65) Prior Publication Data

US 2013/0209241 A1 Aug. 15, 2013

(30) Foreign Application Priority Data

Feb. 10, 2012 (EP) .................................... 12154931

(51) Int. Cl.
F01D 5/14 (2006.01)
F04D 29/54 (2006.01)
F01D 9/00 (2006.01)
F01D 9/04 (2006.01)

(52) U.S. Cl.
CPC ................. F01D 9/00 (2013.01); F01D 5/146 (2013.01); F01D 9/041 (2013.01); F04D 29/544 (2013.01); F05D 2240/40 (2013.01); F05D 2270/17 (2013.01); Y02T 50/673 (2013.01)

(58) Field of Classification Search
CPC ........ F01D 5/141; F01D 5/142; F01D 5/143; F01D 5/145; F01D 1/04; F01D 5/146; F04D 29/544
See application file for complete search history.

(56) References Cited

U.S. PATENT DOCUMENTS

| 6,099,249 | A | 8/2000 | Hashimoto | |
| 6,350,103 | B1 * | 2/2002 | Hashimoto et al. | ........ 415/199.5 |
| 8,534,997 | B2 * | 9/2013 | Guemmer | ..................... 415/181 |
| 8,573,941 | B2 | 11/2013 | Hoeger | |
| 2010/0111683 | A1 * | 5/2010 | Konter et al. | ................ 415/191 |
| 2010/0303629 | A1 | 12/2010 | Guemmer | |

FOREIGN PATENT DOCUMENTS

| DE | 697 30 663 T2 | 9/2005 |
| DE | 102009013399 | 9/2010 |
| EP | 2261463 A2 | 12/2010 |

* cited by examiner

*Primary Examiner* — Nathaniel Wiehe
*Assistant Examiner* — Jason Davis
(74) *Attorney, Agent, or Firm* — Davidson, Davidson & Kappel, LLC

(57) ABSTRACT

A turbomachine is disclosed having at least one blade row group, which is situated in a main flow path and has at least two adjacent blade rows, viewed in the main flow direction, each blade row having a plurality of blades, the rear edges of the blades of the upstream blade row and the front edges of the blades of the downstream blade row in the peripheral direction being situated at an edge distance which varies starting from a main flow path center in the direction of at least one main flow limitation, the periphery-side edge distance increasing or decreasing on both sides.

11 Claims, 13 Drawing Sheets

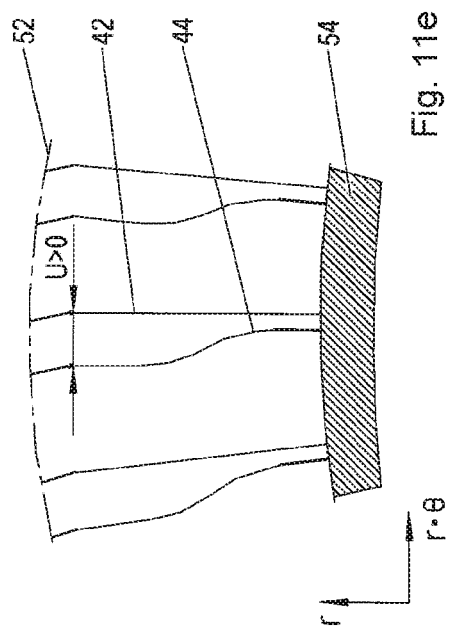

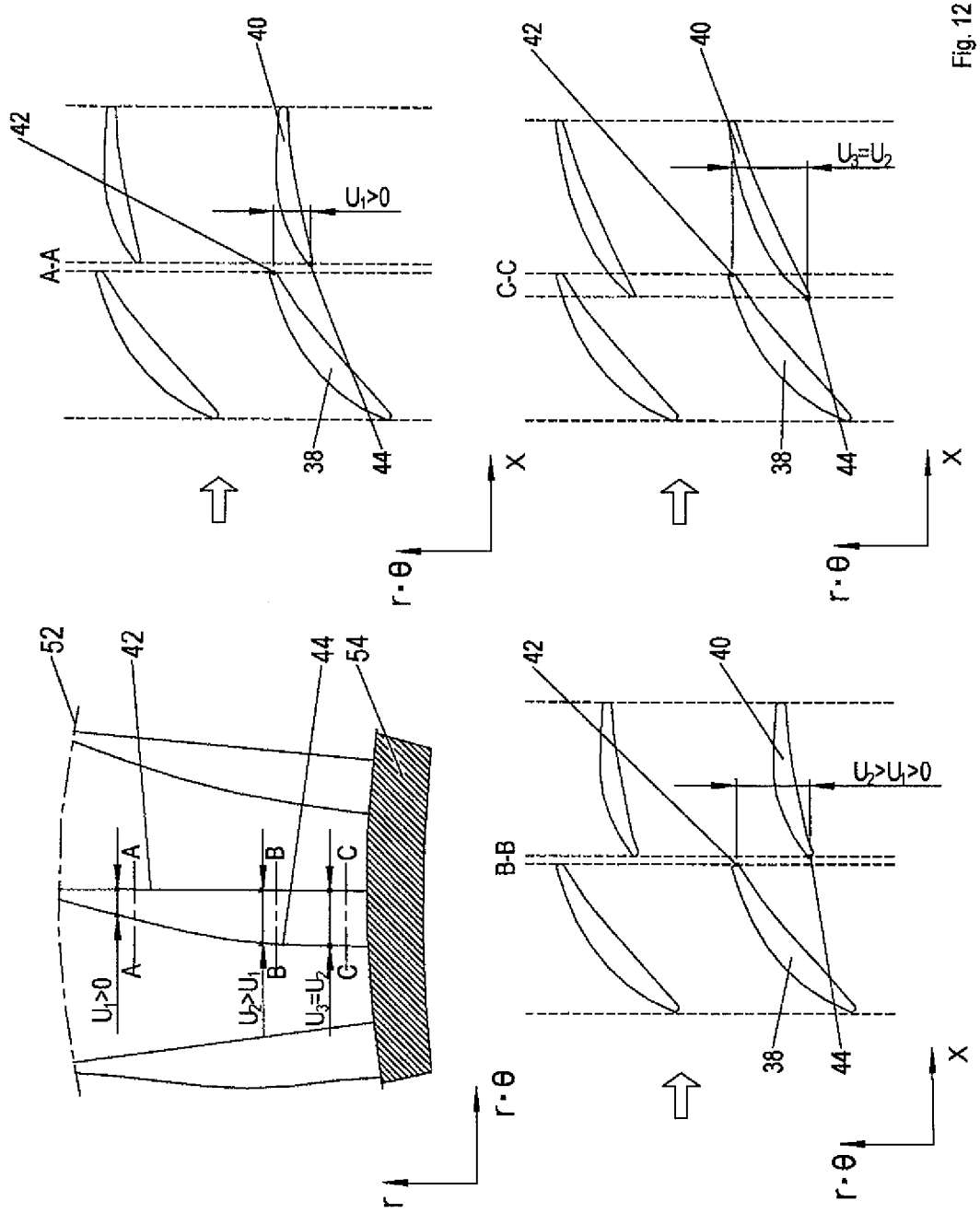

TURBOMACHINE

This claims the benefit of European Patent Application EP 12154931.5, filed Feb. 10, 2012 and hereby incorporated by reference herein.

The present invention relates to a turbomachine.

BACKGROUND

The maximum deflection of a blade row of a turbomachine and thus its aerodynamic strength are delimited, on the one hand, by a flow separation on the blade profile. On the other hand, the maximum deflection is delimited by a separation of a boundary layer flow at the hub- and the housing-side side walls. To increase the deflectability of the blade rows, double-row blade arrangements are known. A known turbomachine having such an arrangement is shown in FIG. 1. It has a hub 2 which is rotatably mounted in a housing 4 around a rotor axis 6 extending in longitudinal direction x. Hub 2 and housing 4 delimit an annular main flow path 8 through which there is a flow from left to right according to the horizontal arrow and in which a rotor-side blade row group 10, a stator-side blade row group 12, and an adjustable blade row group 14 are situated, for example. Blade row groups 10, 12, 14 each have two blade rows which include a plurality of blades 16, 18 and which are situated one after another in the flow direction. For the sake of clarity, the rotor-side blade row group is preferably provided with reference numeral 10 in the following. Rotor-side blade row group 10 and stator-side blade row group 12 are each fixedly connected to hub 2 and to housing 4, a gap 20 being formed between the blade tips of blades 16, 18 and housing 4 and hub 2. Blades 16, 18 of adjustable blade row group 14 are each mounted at their ends on a rotary disk 22, 24 and are pivotable around a transverse axis 26 according to the rotary arrow. Front blades 16 each have a rear edge 28 facing one of rear blades 18. Rear blades 18 each have a front edge 30 facing one of front blades 16. Edges 28, 30 have a linear shape and extend radially almost transversely to the transverse flow direction, so that a constant axial edge distance is formed between edges 28, 30 and thus between blades 16, 18. Furthermore, a constant edge distance in the peripheral direction is formed between edges 28, 30. Moreover, a blade 32 of a single rotor blade row is shown in FIG. 1.

However, it has been found that in the side wall area, i.e., in the area of hub 2 and/or of housing 4, a blade contour is necessary, due to the influence of the boundary layer, which deviates from a main flow path center 34 and with the aid of which the flow conditions in the side wall area, which are changed with regard to main flow path center 34, may be considered. In EP 2 261 463 A2, it is therefore proposed for blade row groups to set a meridional distance between the rear edges of the front blades and the front edges of the rear blades in such a way that this distance increases starting from a main flow path center in the direction of a hub- or housing-side side wall.

In DE 697 30 663 T2, a turbomachine having a tandem cascade is shown in which starting from a main flow path center a periphery-side edge distance between a particular front edge of an upstream blade row and a particular rear edge of a downstream blade row increases in the direction of a tip-side main flow limitation and decreases in the direction of a hub-side main flow limitation. The periphery-side edge distance according to DE 697 30 663 T2 thus has different algebraic signs starting from main flow path center.

SUMMARY OF THE INVENTION

It is an object of the present invention to provide a turbomachine having optimized flow conditions.

The present invention provides a turbomachine having at least one blade row group which is situated in a main flow path and at least two adjacent blade rows, viewed in the main flow direction, each blade row having a plurality of blades. The rear edges of the blades of the upstream blade row and the front edges of blades of the downstream blade row are situated in the peripheral direction at an edge distance which varies in the direction of both main flow limitations starting from a main flow path center. The edge distance increases or decreases on both sides according to the present invention.

Due to the periphery-side edge distance which varies starting from the main flow path center in the direction of at least one main flow limitation, the positioning of the blades to one another and their interaction are adapted to the main flow in the side wall area, thus facilitating a separation-free flow through the blade rows. By radially changing the blade arrangement—according to the present invention their peripheral edge distance—changed flow boundary conditions in the side wall area are considered and flow separations in the side wall area are reduced.

In one exemplary embodiment, the edge contour is identical in the direction of the main flow limitations.

In one alternative exemplary embodiment, the edge contour varies in the direction of the main flow limitations.

In one exemplary embodiment, the edge distance steadily increases in the direction of the main flow limitation.

Here, the edge distance may increase up to a maximum and then decrease. Here, "decrease" means decreasing to a value which is found between the maximum and the edge distance on the main flow path center, so that in the direction of the main flow limitations the edge distance has increased in every height area in relation to its value on the main flow path center.

Alternatively, the edge distance may also be constant after the maximum.

In another exemplary embodiment, the edge distance steadily decreases in the direction of the main flow limitations.

Here, the edge distance may decrease up to a minimum and then increase. Here, "increase" means increasing to a value which is found between the particular minimum and the edge distance on the main flow path center, so that in the direction of the main flow limitations the edge distance has decreased in every height area in relation to its value on the main flow path center.

Alternatively, the edge distance may also be constant after the minimum.

Basically, the edge distance may assume values up to a blade pitch and beyond.

To implement the varying edge distance in the peripheral direction, the edges of the blades of the one blade row have a curve-like contour and the edges of the blades of the other blade row have a linear contour.

In one alternative exemplary embodiment, the rear edges and the front edges each have a curve-like contour.

In order to take into consideration a possible asymmetry of the edge contours in the direction of the hub-side main flow limitation and the housing-side main flow limitation, the rear edges and the front edges of the main flow path center may intersect at an angle $\phi=90°$ or $\phi\neq90°$.

Other advantageous exemplary embodiments of the present invention are the subject matter of the other subclaims.

Furthermore, the edge distance in the direction of the main flow limitations may be constant and then increase.

Moreover, the edge distance in the direction of the main flow limitations may be constant and then decrease.

BRIEF DESCRIPTION OF THE DRAWINGS

In the following, preferred exemplary embodiments of the present invention are elucidated in greater detail with reference to the schematic illustrations.

FIG. 12 shows an exemplary embodiment illustrating an edge distance in the peripheral direction which initially increases and is then constant.

DETAILED DESCRIPTION

Figure 1:
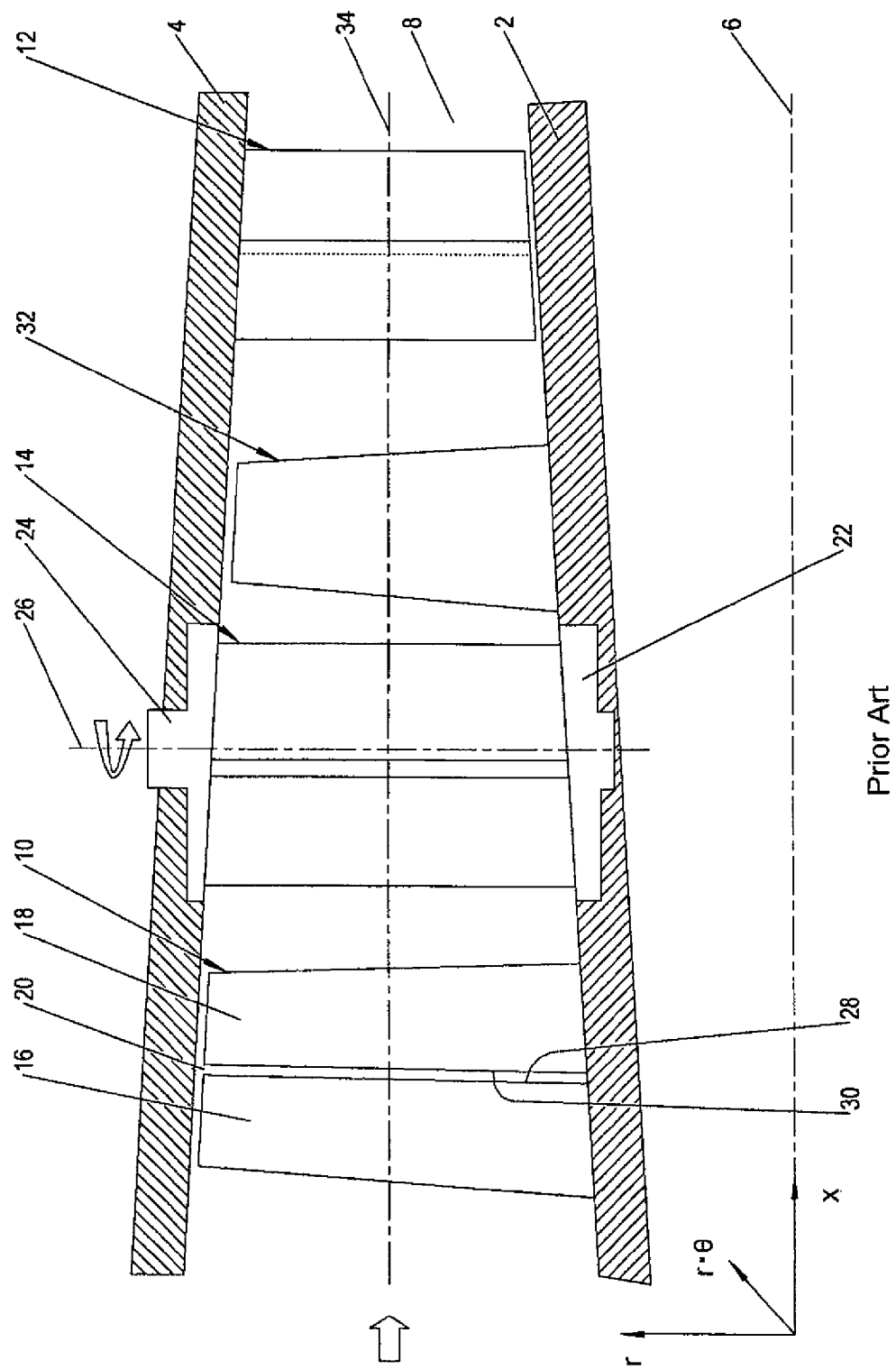
FIG. 1 shows a longitudinal section through a main flow path of a known turbomachine.

In the following, identical constructive elements preferably have identical reference numerals, it being possible that only individual elements are provided with reference numerals for the sake of clarity.

Figure 2:
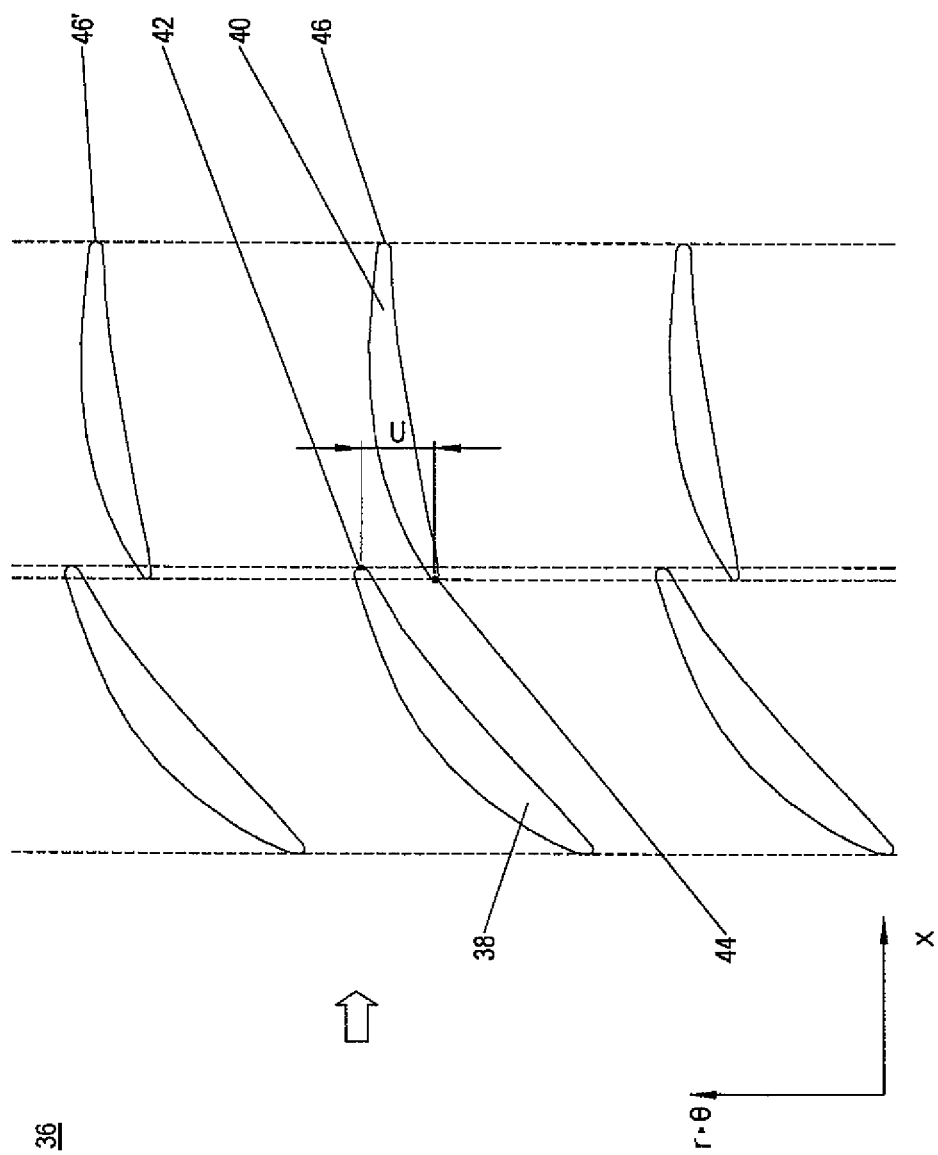
FIG. 2 shows a definition of an edge distance in the peripheral direction.

FIG. 2 shows a top view of blade row group 36 of a turbomachine, e.g., a stationary gas turbine or a jet engine, to illustrate an edge distance U according to the present invention in the peripheral (circumferential) direction of blade row group 36. Blade row group 36 has at least two blade rows which are adjacent in the main flow direction and have a plurality of blades 38, 40 each. Edge distance U is cut in the peripheral direction and thus transversely to the main flow direction between a rear edge of upstream or front blade 38 and a front edge 44 of downstream or rear blade 40. Moreover, a blade pitch T is plotted in FIG. 2 which is cut in the peripheral direction between rear edges 46, 46' of downstream blades 40.

Figure 3:
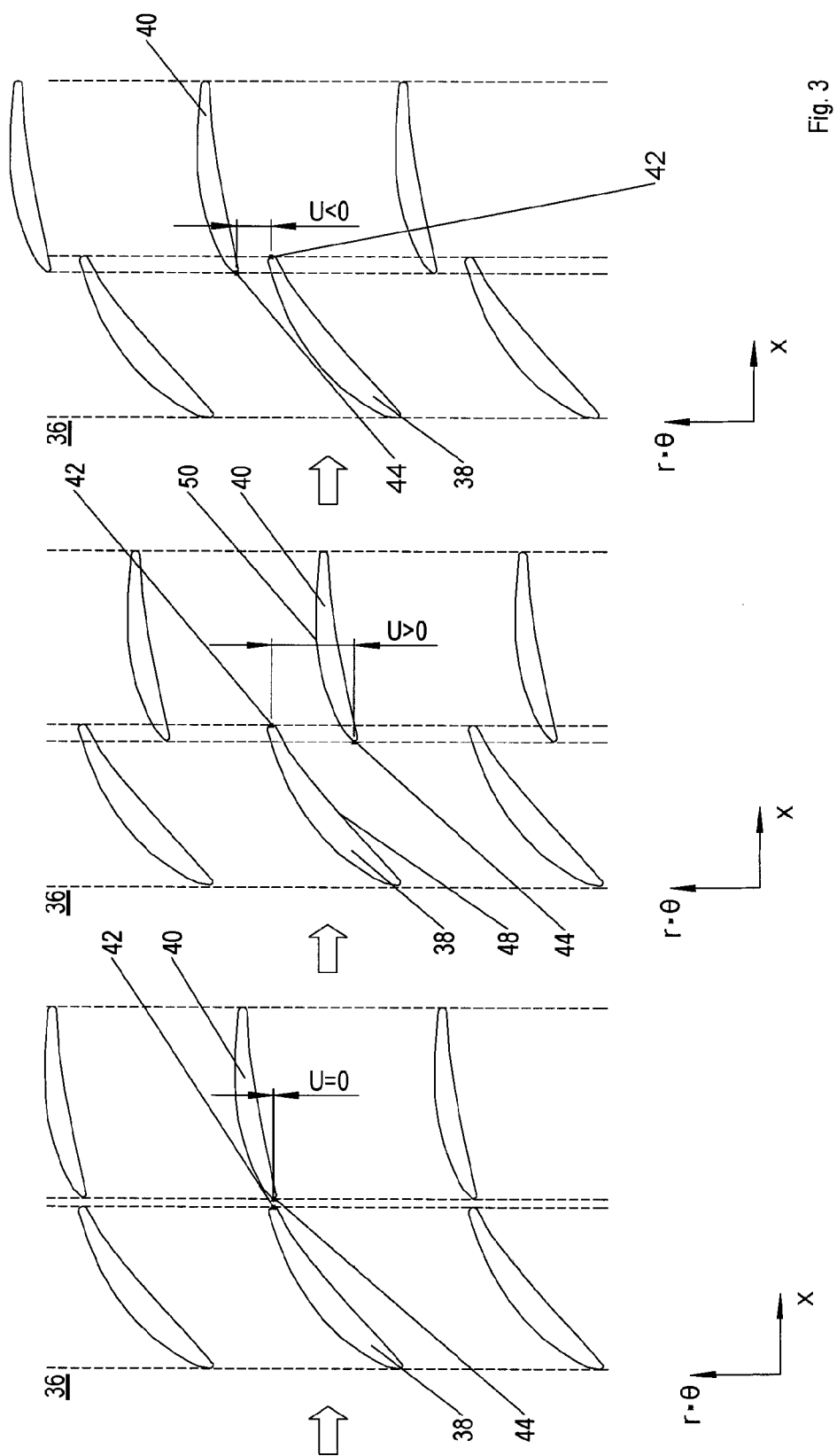
FIG. 3 shows value ranges of the edge distance in the peripheral direction.

As shown in the middle top view in FIG. 3, edge distance U is positively determined from a pressure side 48 of front blade 38 to suction side 50 of rear blade 40. According to this definition, edge distance U assumes positive values (U>0) if front edge 44 of rear blade 40 is situated on the pressure side of front blade 38, as shown in the middle top view. Edge distance U assumes negative values (U<0) if front edge 44 of rear blade 40 is situated on the suction side of front blade 38, as shown in the right-hand top view. "Pressure side" means close to pressure side 48 of a front blade 38 and spaced apart from a suction side 50 of an adjacent front blade 38. "Suction side" means close to suction side 50 of a front blade 38 and spaced apart from a pressure side 48 of an adjacent front blade 38. Basically, smaller edge distance U between rear blade 40 and front blades 38, which flank the former laterally so to speak, is always to be used. As shown in the left-hand illustration, an edge distance U=0 if rear edge 42 and front edge 44 lie on top of one another.

According to the present invention, edge distance U in the peripheral direction increases or decreases starting from a main flow path center or a middle intersecting line, in the direction of both main flow limitations. The increase or decrease may be symmetric or asymmetric in this case. The contour of edges 42, 44 in the direction of the main flow path limitations increases or decreases on both sides, but edge distance U on the main flow path center is always greater or smaller than in an area between the main flow path center and the particular main flow limitation.

The main flow limitations or limiters represent a hub- and housing-side area of the turbomachine and are directly a hub or housing section or a blade shroud, for example. In the following, exemplary edge contours are explained in greater detail in FIGS. 4 through 12. The variation of edge distance U or the contour of edges 42, 44 may be used with any type of blade system. Examples include rotors having a gap strip or a shroud, stators with a gap, a semi-gap, or without a gap, as well as adjustable stators. In FIGS. 4 through 12, the curve contours are observed against the flow direction through the main flow path, so that FIGS. 4 through 12 represent back views, so to speak. The sectional illustrations are illustrated in the flow direction from left to right. For the sake of clarity, only a height area between main flow path center 52 and one of main flow limitations 54 is observed in most of the Figures, even if periphery-side edge distance U increases or decreases toward both main flow limitations according to the present invention, as mentioned previously. However, in FIG. 4, a second flow limiter 154 is shown schematically, with the edges 42, 44 for that pair of blades shown passing between both flow limiters 54, 154

Figure 4:
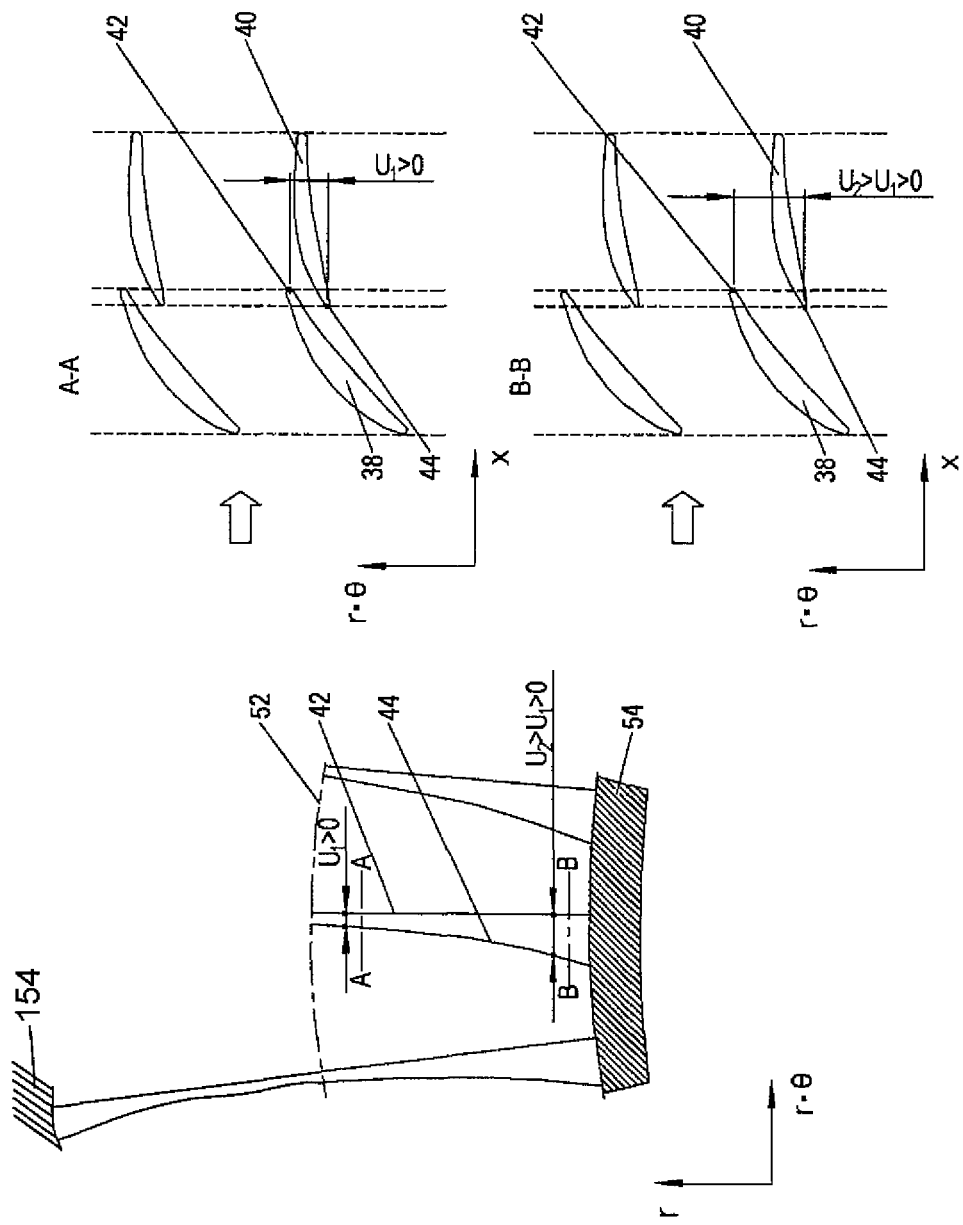
FIG. 4 shows an exemplary embodiment of a blade row group according to the present invention.

In the exemplary embodiment shown in FIG. 4, edge distance U in the peripheral direction steadily increases starting from main flow path center 52 in the direction of main flow limitation 54. Rear edge 42 of front blade 38 has a linear shape. Front edge 44 of rear blade 40 has a curve-like contour to illustrate increasing edge distance U. As illustrated by sections A-A and B-B, rear blade 40 is situated on the pressure side of front blade 38 so that edge distance U assumes positive values across the entire radial height between main flow limitation 54 and main flow path center 52.

Figure 5:
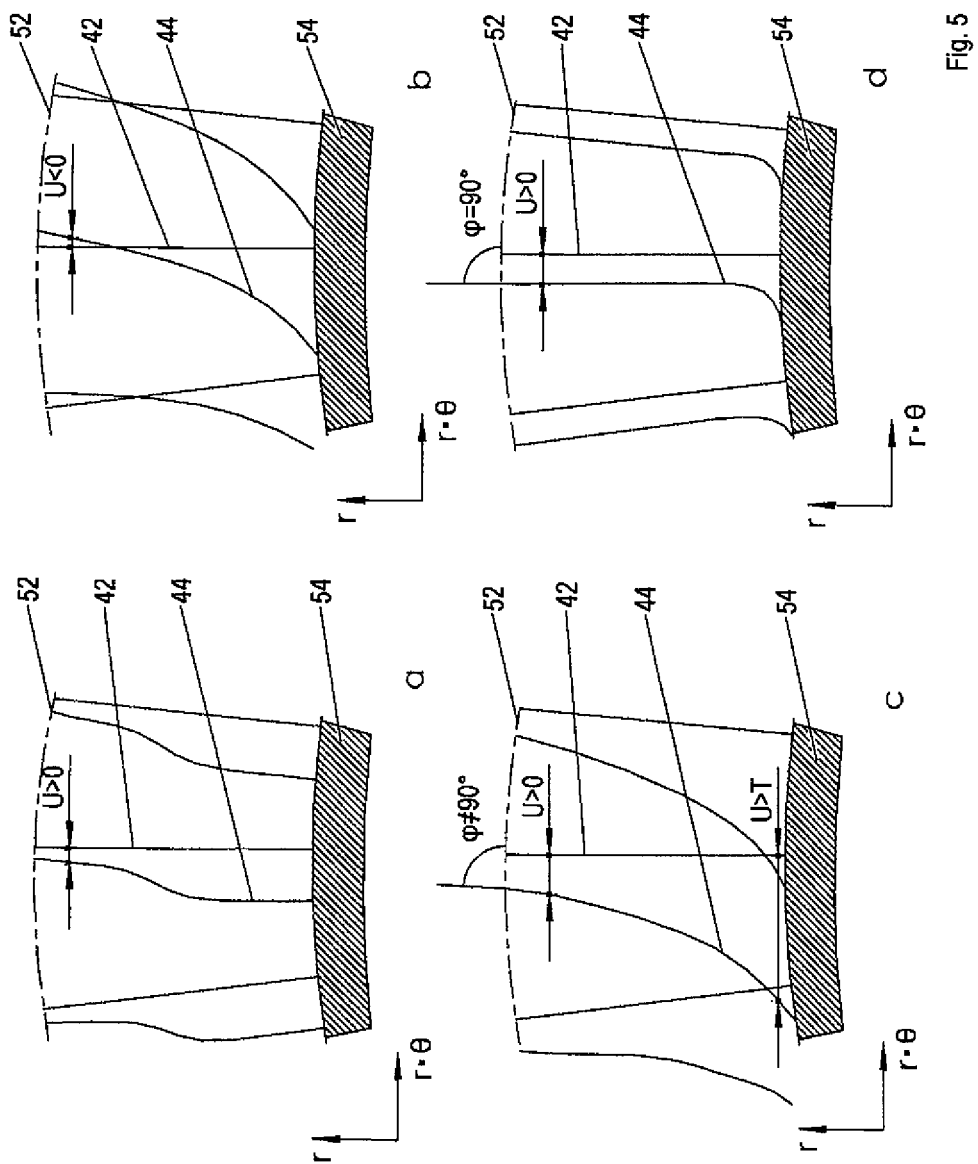
FIG. 5 shows exemplary embodiments illustrating an increasing edge distance in the peripheral direction.

FIG. 5 shows other exemplary embodiments in which edge distances U in the peripheral direction each increase starting from main flow path center 52 in the direction of main flow limitation 54. Front blades 38 each have one linear rear edge 42. Front edges 44 of rear blades 40 are curve-shaped or are provided with a curve-shaped section in order to vary edge distance U. As shown with reference to the exemplary embodiments in segments a, c, and d, edge distance U may always assume positive values and have a value which is greater than blade pitch T in the area of main flow limitation 54, as shown in segment c, in particular. The term "increase" is also understood to mean a transition from negative to positive values, as shown in segment b. It is shown in segment d how edge distance U has a constant value starting from main flow path center 52 and does not increase until it reaches an area close to main flow limitation 54. As the reference numerals in segment c show, front edges 44 may intersect main flow path center 52 at an angle $\phi \neq 90°$. As shown in segment d, front edges 44 may, however, also intersect main flow path center 52 at an angle $\phi = 90°$.

Figure 6:
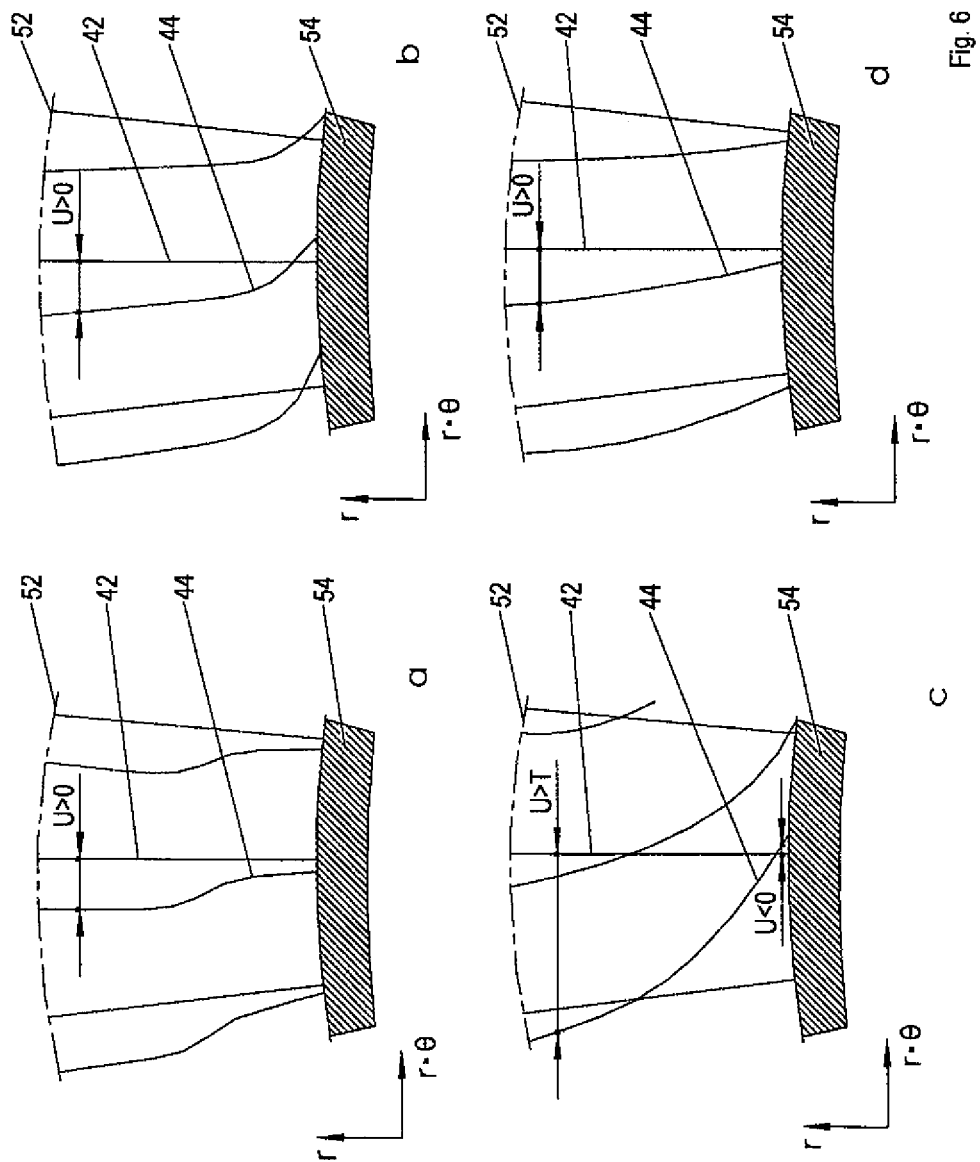
FIG. 6 shows exemplary embodiments illustrating a decreasing edge distance in the peripheral direction.

FIG. 6 shows four exemplary embodiments in which edge distances U each decrease between edges 42, 44 starting from main flow path center 52 in the direction of main flow limitation 54. Rear edges 42 of front blades 38 have a linear shape and front edges 44 of rear blades 40 are curve-shaped to vary edge distance U. As shown in segments b and c, the term "decrease" means, among other things, a transition from positive values in the area of main flow path center 52 to negative values in the direction of main flow limitation 54. Moreover, the term "decrease" means that the absolute value of the negative values increases. As additionally shown in segment c, edge distance U may have a value which is greater than blade pitch T in the area of main flow path center 52.

Figure 7:
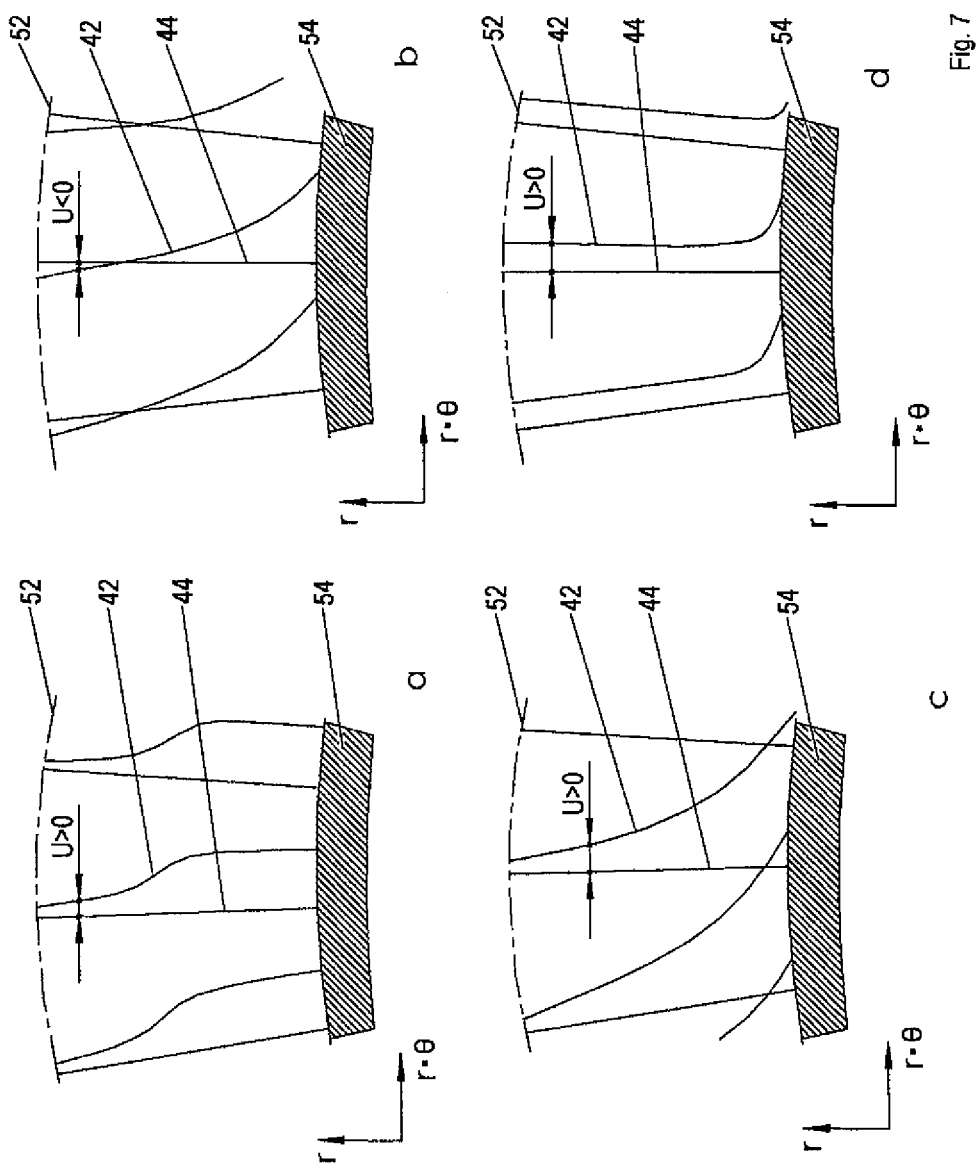
FIG. 7 shows other exemplary embodiments illustrating an increasing edge distance in the peripheral direction.

FIG. 7 shows other exemplary embodiments illustrating an edge distance U in the peripheral direction which increases starting from main flow path center 52 in the direction of main flow limitation 54. The essential difference from the exemplary embodiments shown in FIG. 5 is that in these blade row groups 36, front edges 44 of rear blades 40 have a linear shape and rear edges 42 of front blades 38 are curve-shaped, so that reference is made to the explanations concerning FIG. 5.

Figure 8:
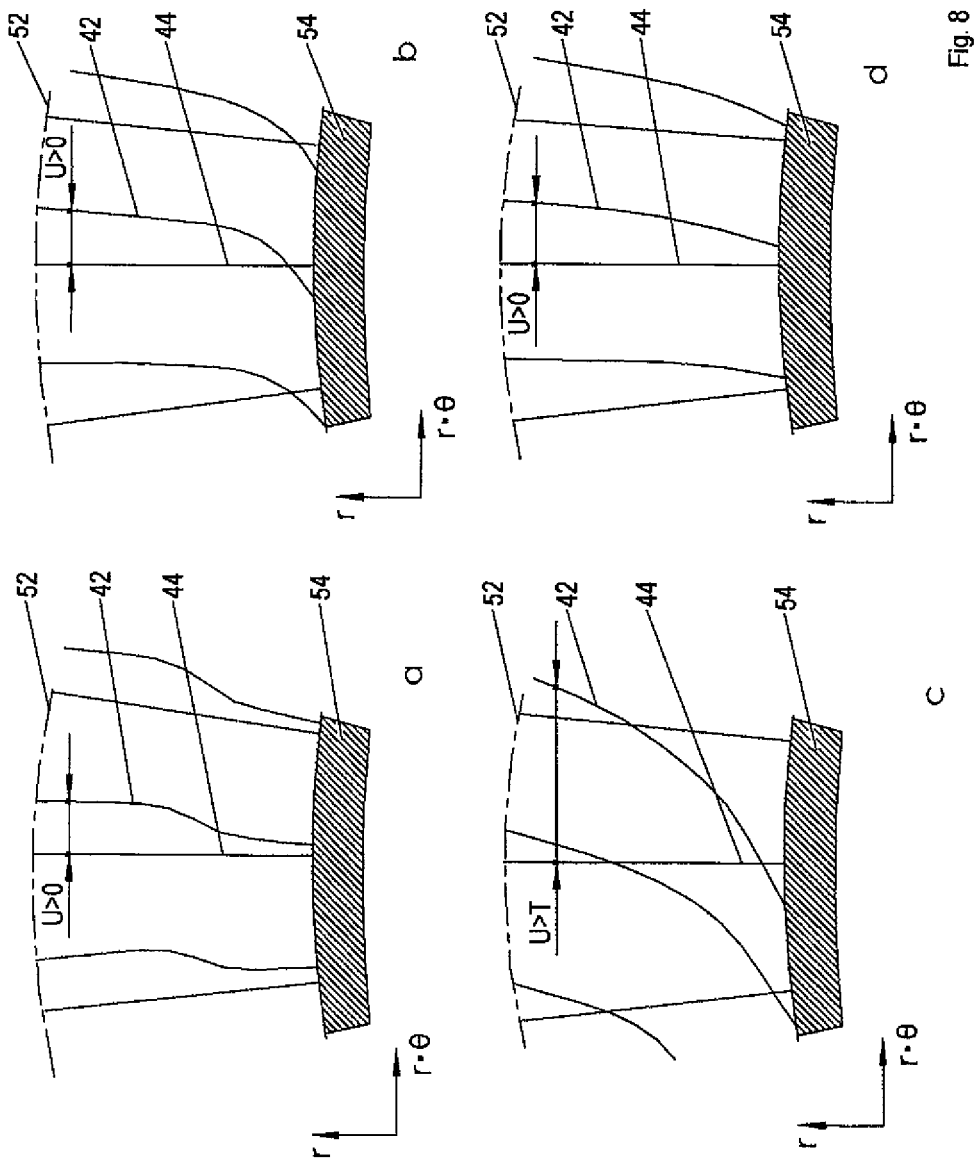
FIG. 8 shows other exemplary embodiments illustrating a decreasing edge distance in the peripheral direction.

FIG. 8 shows four additional exemplary embodiments illustrating an edge distance U in the peripheral direction which decreases starting from main flow path center 52 in the direction of main flow limitation 54. The essential difference from the exemplary embodiments shown in FIG. 6 is that in these blade row groups 36, front edges 44 of rear blades 40 have a linear shape and rear edges 42 of front blades 38 are curve-shaped, so that additional explanations are dispensed with and reference is made to FIG. 6.

Figure 9:
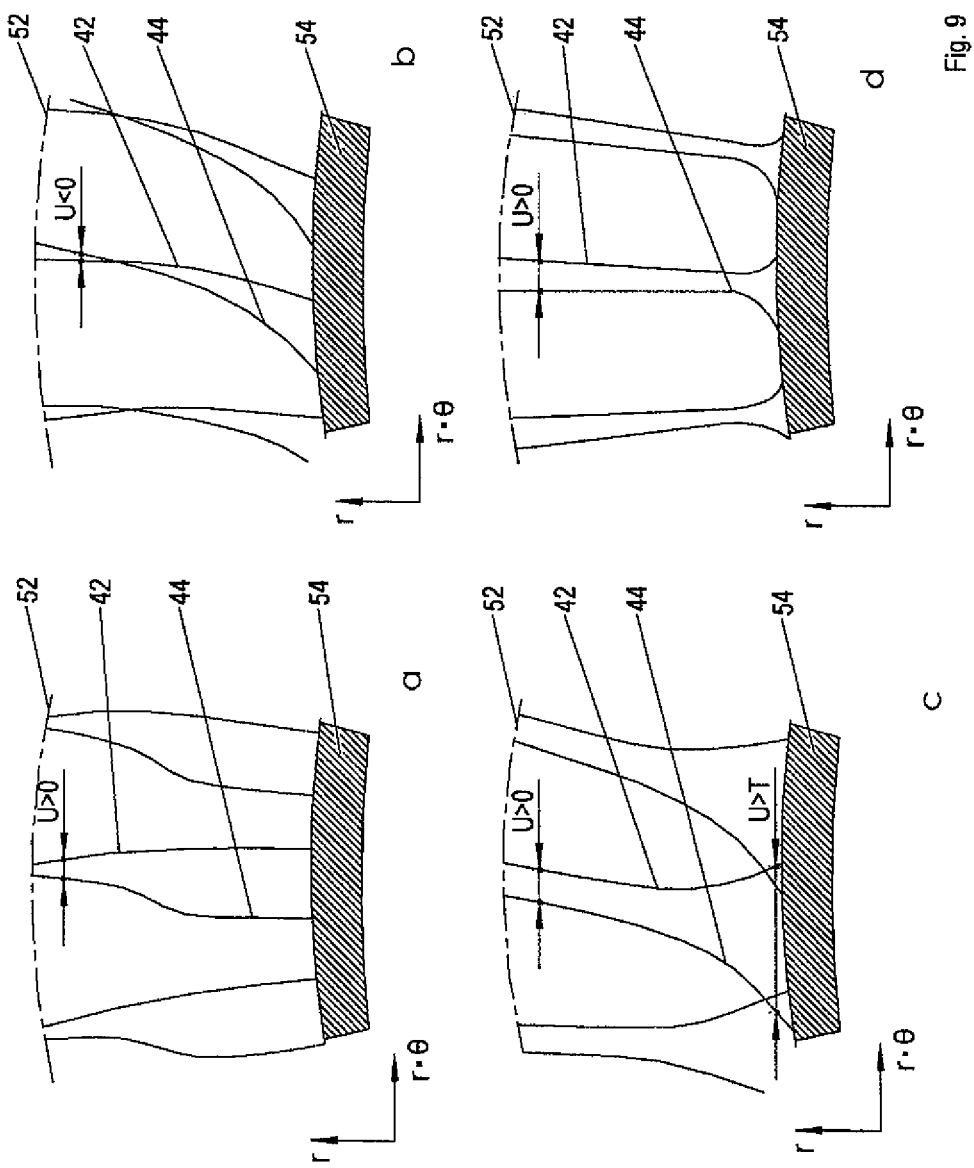
FIG. 9 shows other exemplary embodiments illustrating an increasing edge distance in the peripheral direction.

In segments a, b, and c, FIG. 9 shows four exemplary embodiments illustrating an edge distance U in the peripheral direction which steadily increases starting from main flow path center 52 in the direction of main flow limitation 54. In segment d, an exemplary embodiment is shown illustrating an edge distance U, which decreases starting from main flow path center 52, and a subsequently increasing edge distance U which has its maximum at main flow limitation 54. Front blades 38 of the four exemplary embodiments each have a curve-shaped rear edge 42, and rear blades 40 each have a curve-shaped front edge 44.

Figure 10:
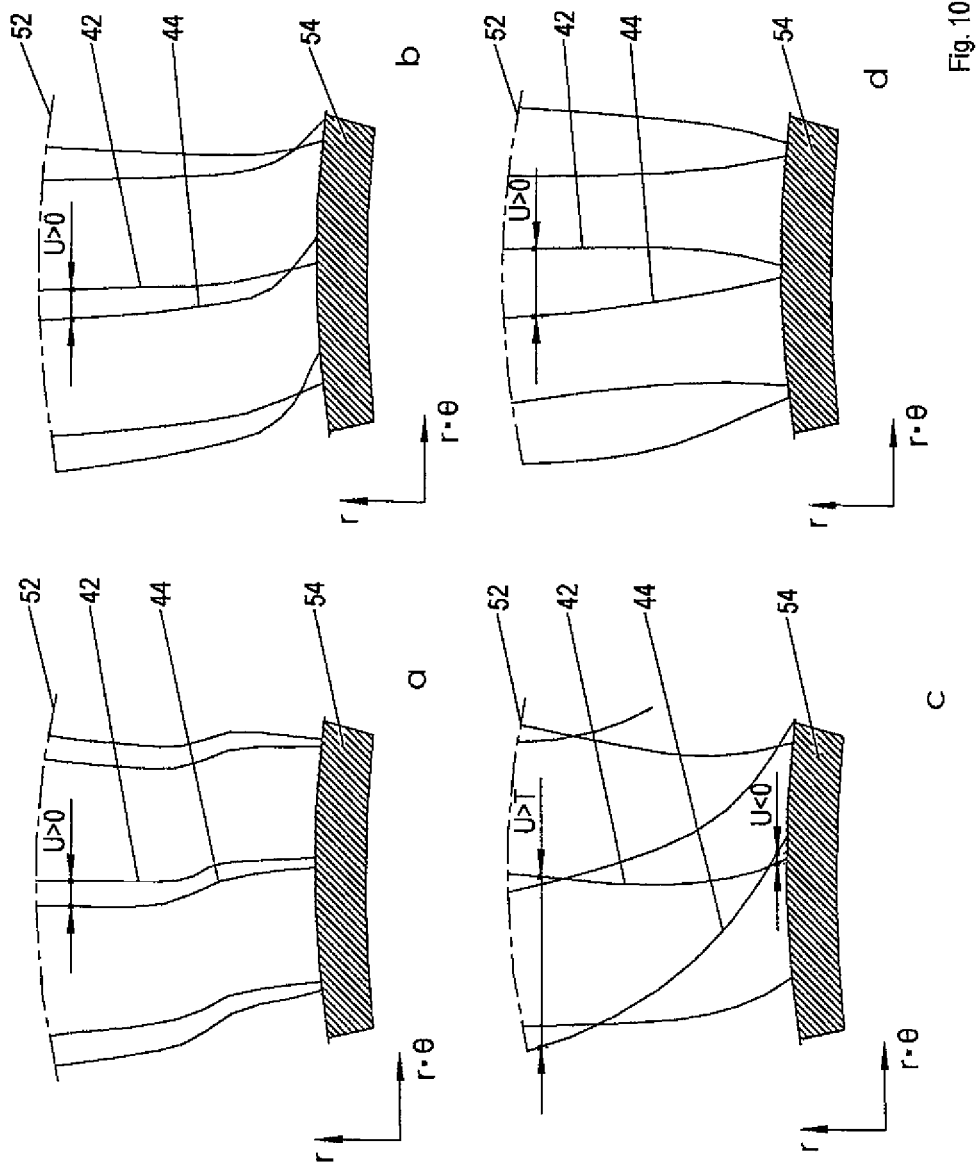
FIG. 10 shows other exemplary embodiments illustrating a decreasing edge distance in the peripheral direction.

FIG. 10 shows four additional exemplary embodiments illustrating curve-shaped rear edges 42 and curve-shaped front edges 44 which are arranged in relation to one another in such a way that edge distance U steadily decreases starting from main flow path center 52 in the direction of main flow limitation 54, See FIGS. 6 and 8 for additional explanations.

Figure 11:
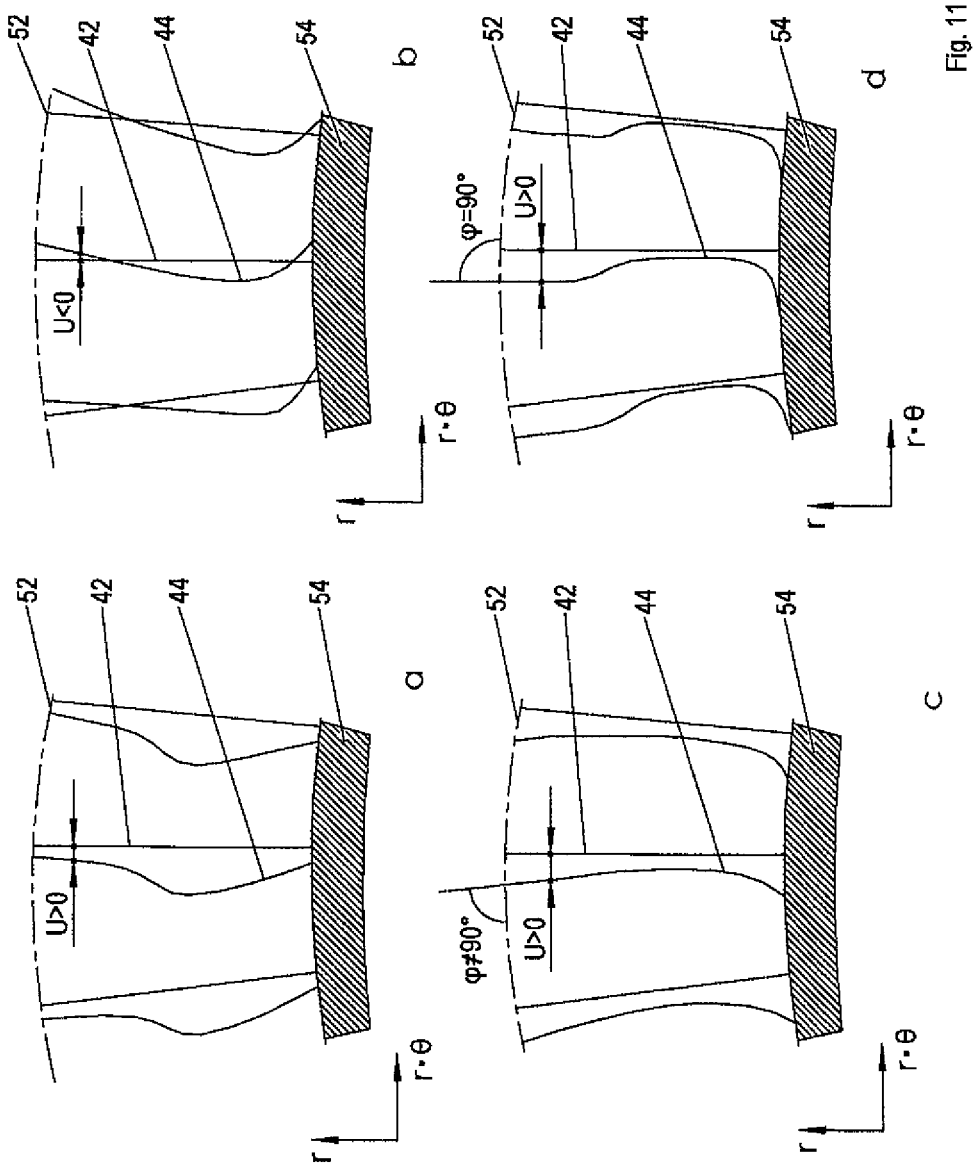
FIG. 11 shows exemplary embodiments illustrating an edge distance in the peripheral direction which partially increases and decreases or partially decreases and increases.

FIG. 11 shows exemplary embodiments in which edge distances U in the peripheral direction decrease or increase starting from main flow path center 52 only across areas of a radial height in the direction of main flow limitation 54 and then increase or decrease again and/or be constant across a remaining height area. In all exemplary embodiments, rear edge 42 of front blade 38 has a linear shape and front edge 44 of rear blade 40 is curve-shaped to vary edge distance U. In the exemplary embodiment shown in segment a, edge distance U, for example, increases starting from main flow path center 52 and then, after reaching a maximum, decreases at main flow limitation 54 to a minimum, which is greater than edge distance U on main flow path center 52. In the exemplary embodiment shown in segment b, edge distance U assumes negative values in the area of main flow path center 52 and in the area of main flow limitation 54. Edge distance U has positive values in an area between these two negative value areas. Here, edge distance U at main flow limitation 54 is identical or almost identical to edge distance U on main flow path center 52. In the exemplary embodiment shown in segment c, edge distance U decreases up to a minimum starting from main flow path center 52 and then increases in the direction of main flow limitation 54, reaching a positive maximum at main flow limitation 54. It is shown in segment d how edges 42, 44 run in parallel across a height area starting from main flow path center 52, so that edge distance U assumes a constant value in this area. Subsequently, front edge 44 is displaced in parallel across a curve section in the direction of rear edge 42, so that edge distance U assumes a minimum constant value. In the area of main flow limitation 54, edge distance U is enlarged again across a curve section of front edge 44. In this exemplary embodiment, edge distance U preferably always assumes positive values, reaching its maximum at main flow limitation 54. Segment e shows the edge distance U decreasing in the direction of the main flow limiters up to a minimum and is then constant, where the rear edge 42 and front edge 44 intersect the main flow path center 52 at an angle $\phi \neq 90$.

FIG. 12 shows an exemplary embodiment in which edge distance U steadily increases starting from main flow path center 52 across a radial height area in the direction of main flow limitation 54 and assumes a constant positive maximum upon reaching a certain radial height. As shown in sections A-A, B-B, and C-C, rear blades 40 are situated on the pressure side of front blades 38, so that edge distance U always assumes positive values. Edge distance U assumes value $U_1$ in the area of main flow path center 52. It steadily increases up to a value $U_2$ in the direction of main flow limitation 54. Value $U_2$ forms the maximum of edge distance U and is constant as $U_3$ until main flow limitation 54.

A turbomachine is disclosed having at least one blade row group, which is situated in a main flow path and has at least two adjacent blade rows, viewed in the main flow direction, each blade row having a plurality of blades, the rear edges of the blades of the upstream blade row and the front edges of the blades of the downstream blade row in the peripheral direction being situated at an edge distance which varies starting from a main flow path center in the direction of at least one main flow limitation, the periphery-side edge distance increasing or decreasing on both sides.

LIST OF REFERENCE NUMERALS 2 hub
4 housing
6 rotor axis
8 main flow path
10 rotor-side blade row group
12 stator-side blade row group
14 adjustable blade row group
16 blade
18 blade
20 blade tip
22 gap
24 rotary disk
26 transverse axis
28 rear edge
30 front edge
32 blade 34 main flow path center
36 blade row group
38 front blade
40 rear blade
42 rear edge
44 front edge
46 rear edge
48 pressure side
50 suction side
52 main flow path center
54 main flow limitation or limiter
U edge distance in the peripheral direction
T blade pitch

What is claimed is:

1. A turbomachine comprising:
at least one blade row group situated in a main flow path and including at least an upstream row of blades and a downstream row of further blades, adjacent to each other in a main flow direction, rear edges of the blades of the upstream row and front edges of the further blades of the downstream row being situated at an edge distance in a peripheral direction varying starting from a main flow path center in a direction of both main flow limiters, the edge distance either increasing or decreasing on both sides of the main flow path center, the edge distance decreasing in the direction of one of the main flow limiters up to a minimum and then increasing.

2. The turbomachine as recited in claim 1 wherein the rear edges of the blades of the upstream row have a curved contour and the front edges of the further blades of the downstream row have a linear contour.

3. The turbomachine as recited in claim 1 wherein the rear edges of the blades of the upstream row have a linear contour and the front edges of the further blades of the downstream row have a curved contour.

4. The turbomachine as recited in claim 1 wherein the rear edges and the front edges have a curved contour.

5. The turbomachine as recited in claim 1 wherein the rear edges and the front edges intersect the main flow path center at an angle $\phi=90°$.

6. The turbomachine as recited in claim 1 wherein the rear edges and the front edges intersect the main flow path center at an angle $\phi 90°$.

7. A turbomachine comprising:
at least one blade row group situated in a main flow path and including at least an upstream row of blades and a downstream row of further blades, adjacent to each other in a main flow direction, rear edges of the blades of the upstream row and front edges of the further blades of the downstream row being situated at an edge distance in a peripheral direction varying starting from a main flow path center in a direction of both main flow limiters, the edge distance increasing or decreasing on both sides of the main flow path center, the edge distance decreasing in the direction of one of the main flow limiters up to a minimum and is then constant.

8. The turbomachine as recited in claim 7 wherein the rear edges of the blades of the upstream row have a curved contour and the front edges of the further blades of the downstream row have a linear contour.

9. The turbomachine as recited in claim 7 wherein the rear edges of the blades of the upstream row have a linear contour and the front edges of the other blades of the downstream row have a curved contour.

10. The turbomachine as recited in claim 7 wherein the rear edges and the front edges intersect the main flow path center at an angle $\phi=90°$.

11. The turbomachine as recited in claim 7 wherein the rear edges and the front edges intersect the main flow path center at an angle $\phi 90°$.

* * * * *